United States Patent [19]

Aoki et al.

[11] 4,382,659

[45] May 10, 1983

[54] LIQUID CRYSTAL DISPLAY DEVICE

[75] Inventors: Shigeo Aoki, Habikino; Shuzo Isogami, Yao; Motomi Hosoda, Kashiwara; Yasuhiro Ukai; Tatsuo Nagayoshi, both of Yao, all of Japan

[73] Assignee: Hosiden Electronics Co., Ltd., Osaka, Japan

[21] Appl. No.: 215,980

[22] Filed: Dec. 12, 1980

[30] Foreign Application Priority Data

Dec. 24, 1979 [JP] Japan ................ 54/168015

[51] Int. Cl.³ ............................. B02F 1/137
[52] U.S. Cl. ........................ 350/335; 350/332
[58] Field of Search ................ 350/332, 334–335, 350/347 R, 347 E; 368/242; 340/765, 784, 716, 701–703

[56] References Cited

U.S. PATENT DOCUMENTS

| 3,828,548 | 8/1974 | Martin ........................... 350/332 |
| 4,097,130 | 6/1978 | Cole, Jr. ....................... 350/335 |
| 4,137,524 | 1/1979 | Chen et al. ................... 350/335 |
| 4,240,709 | 12/1980 | Hörnell ....................... 350/335 |
| 4,241,339 | 12/1980 | Ushiyama ................... 350/335 |

FOREIGN PATENT DOCUMENTS

| 2435422 | 10/1975 | Fed. Rep. of Germany ...... 350/334 |
| 54-97339 | 8/1979 | Japan ............................ 340/701 |
| 1332984 | 10/1973 | United Kingdom ............ 350/335 |

OTHER PUBLICATIONS

Ernstoff et al., "Liquid Crystal Pictorial Display" Conf: 1973 Intern. Electron Devices Meeting, Technical Digest, Wash. D.C. USA, 3–5 Dec. 1973, pp. 548–551.

Primary Examiner—William H. Punter
Attorney, Agent, or Firm—Pollock, Vande Sande and Priddy

[57] ABSTRACT

First and second color liquid crystal display elements of the negative guest-host type are disposed in adjacent and opposing relation to each other and the color liquid crystal display elements provide display in different colors, at least one of electrodes of each color liquid crystal display element having formed therein a display pattern. By the control of a changeover switch, an alternating drive voltage is applied from a drive circuit to one of the first and second color liquid crystal display elements to change the color of a background of the display in accordance with the control of the changeover switch.

9 Claims, 22 Drawing Figures

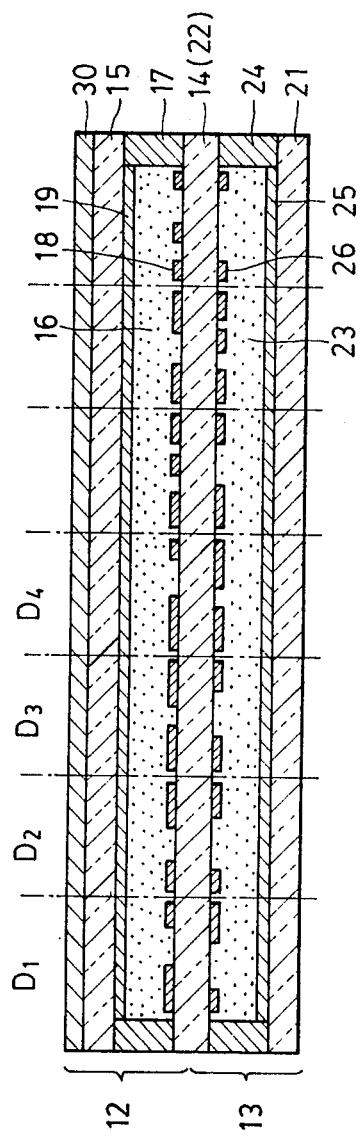

LIQUID CRYSTAL DISPLAY DEVICE

BACKGROUND OF THE INVENTION

The present invention relates to a liquid crystal display device which selectively provides a plurality of displays, using color liquid crystal display elements.

For providing selectively a plurality of displays, there has been proposed a display device, for example, of the type in which display elements arranged in a plane are selectively irradiated by light from behind to provide desired displays. Such a display device, however, has the defects that the overall display area is large and that the display position varies with the display element being selected. Further, there has been proposed a display device in which two color liquid display elements are assembled together in opposing relation and their patterns are selectively displayed. In this display device, the patterns are displayed in different colors but with a background of the same color. Accordingly, the display position remains unchanged. However, when the display pattern is relatively small, it is difficult for the user to instantaneously judge which one of the two display patterns is being displayed.

When it is necessary to display a plurality of display patterns and indicate that one of them is being selected, as in the case of a channel display device of TV receiver sets, it is preferred that the selected and unselected display patterns can readily be discerned from each other. In view of this, no satisfactory channel display devices employing liquid crystals are available at present.

It is an object of the present invention to provide a liquid crystal display device which has a small display area and is capable of selectively providing a plurality of displays in color at the same position.

Another object of the present invention is to provide a liquid crystal display device which permits an easy interpretation of a display pattern even if viewed from a distance or for a very short time.

Yet another object of the present invention is to provide a liquid crystal display device which is able to provide a selected one or more of a plurality of displays, making a clear distinction between the selected and the unselected displays.

SUMMARY OF THE INVENTION

According to the present invention, two color liquid crystal display elements for producing different color displays are assembled together in opposing relation, a display pattern such as a character, figure, symbol or the like is formed on an electrode of at least one of the liquid crystal display elements, and a drive voltage is applied to one or the other of the liquid crystal display elements by controlling a drive circuit through a changeover switch. By the control of the drive circuit, the background color of the display pattern is changed to indicate what is being displayed.

A plurality of channel display sections, each composed of such two color liquid crystal display elements, are arranged in line. On the electrode of at least one of the color liquid crystal display elements of each channel display is formed a character, figure or symbol indicating the channel and by selectively controlling one or more of the changeover switches of a desired one of the channel display sections, the channel display section is displayed with a background of a color different from those of the other unselected channel sections. This creates a clear distinction between the selected channel display section and the unselected ones, permitting an instantaneous interpretation of the selected display. Especially when that color liquid display element of each channel display section which has formed therein the display pattern is disposed on the front side, the selected channel display stands out in relief relative to the other channel displays.

BRIEF DESCRIPTION OF THE DRAWINGS

FIG. 11 illustrates a device constructed in accordance with the present invention wherein all of the display elements are formed as a unitary structure.

DESCRIPTION OF THE PREFERRED EMBODIMENTS

Figure 1:
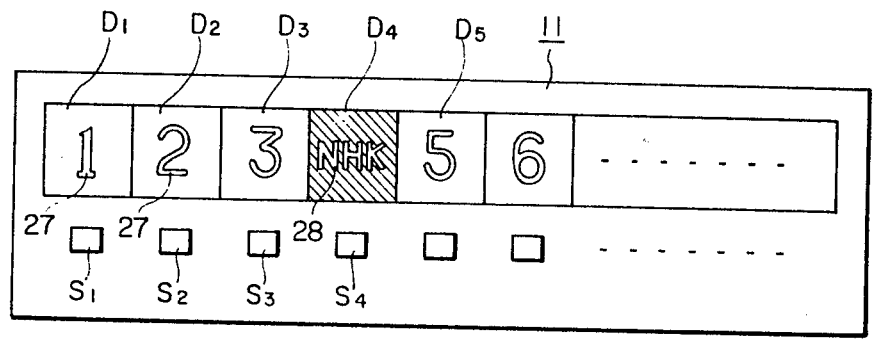
FIG. 1 is a front view illustrating an embodiment of the liquid crystal display device of the present invention.
Figure 2:
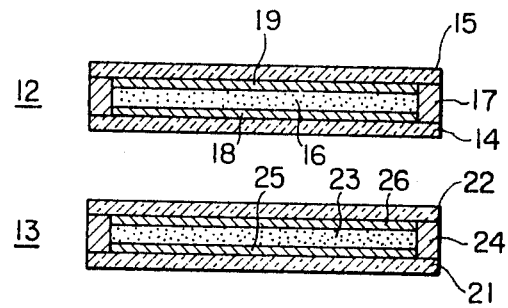
FIG. 2 is a sectional view of a channel display section for use in the present invention.

Referring first to FIGS. 1 and 2, channel display sections $D_1$, $D_2$, ... are arranged on a display panel 11, for example, in a lateral direction. Adjacent the channel display sections $D_1$, $D_2$, ... are provided knobs $S_1$, $S_2$, ... of changeover switches for controlling their channels. The channel display sections $D_1$, $D_2$, ... are each formed by two color liquid crystal display elements or cells 12 and 13 which are assembled together in opposing relation. In the color liquid crystal display element 12, a liquid crystal 16 is interposed between a pair of opposing glass plates 14 and 15, their marginal portions are sealed by sealing members 17, and transparent electrodes 18 and 19 are respectively deposited on the interior surfaces of the glass plates 14 and 15. The color liquid crystal display element 13 is similarly comprised of a pair of glass plates 21 and 22, a liquid crystal 23, sealing members 24 and electrodes 25 and 26. The color liquid crystal display elements 12 and 13 are assembled together, with their glass plates 14 and 22 held in close contact with each other. It is also possible to form the display elements 12 and 13 as a unitary structure, using a common glass plate as a partition wall as will be described subsequently by reference to FIG. 11.

The liquid crystal display elements 12 and 13 provide different color displays, displaying characters, symbols, figures or like patterns indicating the channel. For example, the liquid crystal display elements 12 and 13 of the channel display sections $D_1$, $D_2$, ... are of the guest-host negative type and designed so that when supplied with no drive voltage, the liquid crystal display element 12 looks red over its entire area and the liquid crystal display element 13 looks blue. At least one of the electrodes 18 and 19 of the liquid crystal display element 12 of each channel display section is formed in such a manner that a channel number of a display pattern 27 indicating each channel is provided in the form of a negative pattern. Also in the liquid crystal display elements 13 of the channel display sections $D_1$, $D_2$, ... are respectively formed display patterns 28 indicating the channels. In this example, the display patterns 28 are shown to indicate the channels in patterns different from the display patterns 27 of the liquid crystal display elements 12. The display pattern 27 is formed as the channel number and the display pattern 28 is formed as the channel designation; namely, at least one of the electrodes 25 and 26 of each channel display section is formed so that a channel designation, for example, TBS, NTV, NET, NHK or the like is provided in the form of a negative pattern as the display pattern 28. FIG. 1 shows the case where the knob $S_4$ of the changeover switch is selectively controlled. In this case, "4" of the display pattern 27 of the liquid crystal display element 12 of the channel display section $D_4$ is not displayed and "TBS", "NTV", "NET", etc., except "NHK" of the display patterns 28 of the liquid crystal display elements 13 of the channel display sections $D_1$, $D_2$, $D_3$, $D_5$, etc., are not displayed, either.

Figure 3:
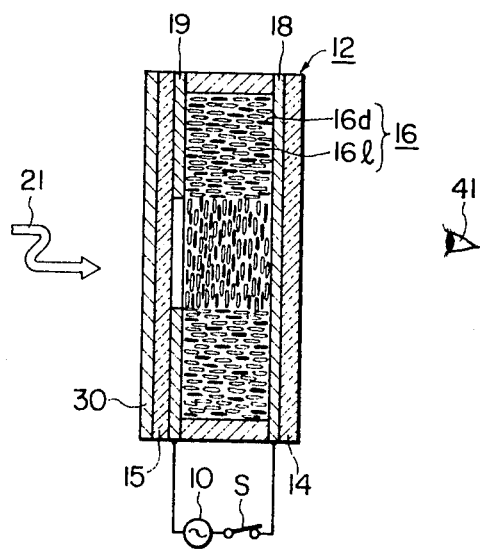
FIG. 3 is a sectional view explanatory of the liquid crystal display operation of a liquid crystal display element 12.

The liquid crystal display elements 12 and 13 are color liquid crystal display elements and can be formed by various types of liquid crystals. For example, in the case of using the negative guest-host type as mentioned previously, dichroic dye molecules 16$d$ are dissolved in a liquid crystal of nematic liquid crystal molecules 16$l$ with a positive dielectric anisotropy $\Delta\epsilon$, as shown in FIG. 3. Upon turning ON the switch S to apply the voltage of an AC power supply 10 across the electrodes 18 and 19, the liquid crystal molecules 16$l$ and the dichroic dye molecules 16$d$ lying between the electrodes 18 and 19 are oriented with their longer axes substantially perpendicular to the electrodes 18 and 19. In the part which does not confront the electrode 19 and which therefore does not have an applied voltage, however, the liquid crystal molecules 16$l$ and the dichroic dye molecules 16$d$ lie with their longer axes substantially parallel to the electrode 18. Light 21 from one side of the liquid crystal display element 12 is incident thereto passing through a polarizer 30. The polarizer 30 is disposed so that the direction of polarization of the light having passed through the polarizer 30 may coincide with the longer axes of the liquid crystal molecules 16$l$ when no voltage is applied. On the other side of the liquid crystal element 12 the part of the electrode 19 looks colorless to the human eye 41 but the part which is not covered with the electrode 19 appears in a color which is determined by the dichroic dye molecules 16$d$. Accordingly, in the case where the display pattern 27 is formed as a negative pattern in the electrode 19 as described previously, the display pattern 27 becomes colorless against a colored background. In the liquid crystal display elements 12 and 13, different dichroic dye molecules of the liquid crystals 16 and 23 are employed to provide displays, for example, in red and blue. The polarizer 30 on the liquid crystal display element 13 on the front side may be omitted.

Figure 4:
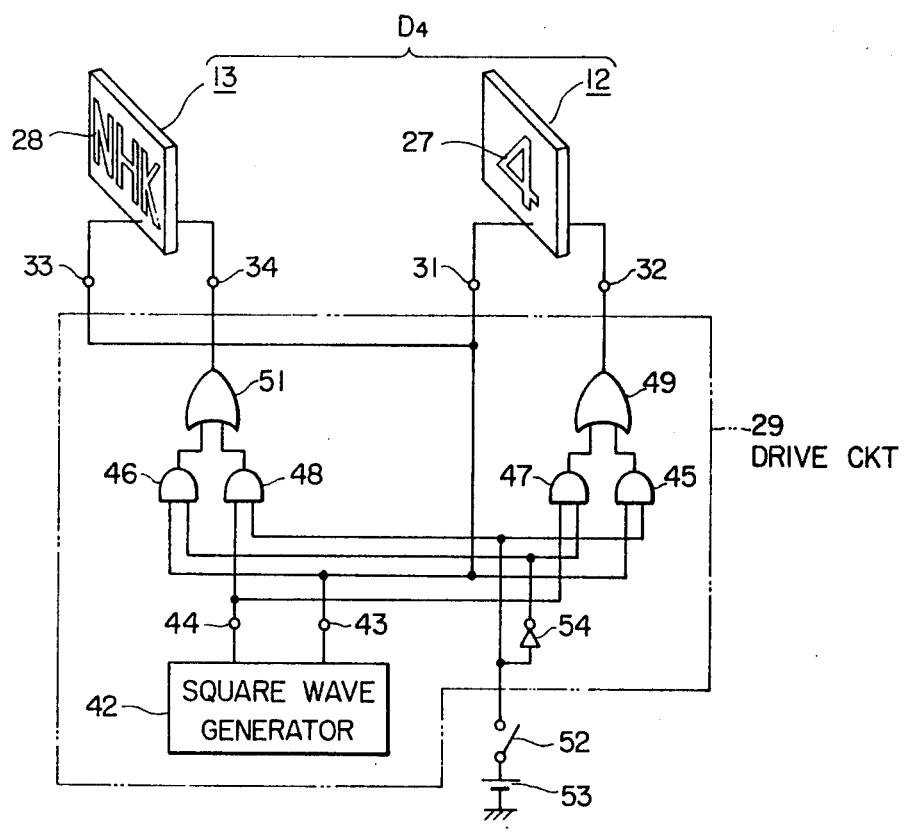
FIG. 4 is a schematic diagram showing examples of liquid crystal display elements and a drive circuit of a channel display section $D_4$.
Figure 5A:
FIGS. 5A to 5D are waveform diagrams showing drive voltages which are applied to respective electrodes of an unselected channel display section.
Figure 5B:
Figure 6B:
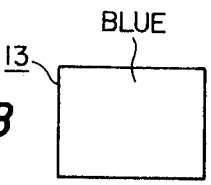

The drive circuits of the channel display sections $D_1$, $D_2$, ... are arranged so that when one of the changeover switch knobs $S_1$, $S_2$, ... is selectively actuated, the selected channel display section produces a display with a background color different from those of the unselected channel display sections. A description will be given, with reference to FIG. 4, of the driving of the channel display section $D_4$. A drive circuit 29 is controlled by the changeover switch knob $S_4$. The drive circuit 29 has four output terminals 31 to 34. The terminals 31 and 32 are respectively connected to the electrodes 18 and 19 of the liquid crystal display elements 12 of the channel display section $D_4$ and the output terminals 33 and 34 are respectively connected to the electrodes 25 and 26 of the liquid crystal display element 13. For example, as shown in FIG. 4, the drive circuit 29 includes a square wave voltage generator 42, which derives at its output terminals 43 and 44 square wave voltages as shown in FIGS. 5A and 5B which have a duty cycle of 50% and are 180° out of phase relative to each other. The square wave voltage at the output terminal 43 is applied directly to output terminals 31 and 33 and AND gates 45 and 46. The square wave voltage at the output terminal 44 is provided to AND gates 47 and 48. The outputs from the AND gates 45 and 47 are supplied via an OR gate 49 to output terminal 32 and the outputs from the AND gates 46 and 48 are applied via an OR gate 51 to output terminal 34. One end of a changeover switch 52 which is controlled by the knob $S_4$ is connected to a DC power source 53 and the other end is connected directly to the AND gates 45 and 48 and to the AND gates 46 and 47 via an inverter 54.

Figure 6A:
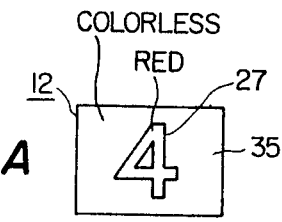
FIGS. 6A to 6C are diagrams respectively showing displays of liquid crystal display elements 12 and 13 of the unselected channel display section and their combined display.
Figure 5C:
Figure 6C:
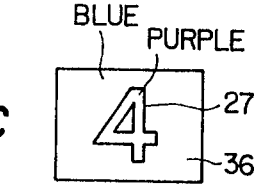
Figure 5D:

In general, for simplicity of the drive circuit design, a unipolarity drive voltage is used to energize the liquid crystal. However, in order to allow a long life of the liquid crystal, unipolarity voltages of the same level are alternately applied to the electrodes on both sides of the liquid crystal so as to avoid application of an average DC current to the liquid crystal. In the present embodiment, the drive circuit 29 operates in the manner described hereinbelow. When the changeover switch knob $S_4$ is not actuated, namely, the changeover switch 52 is in the OFF state, 180° out-of-phase square wave voltages, such as shown in FIGS. 5A and 5B, are respectively provided at the output terminals 31 and 32 and square wave voltages of the same waveform as the voltage of FIG. 5A, such as shown in FIGS. 5C and 5D, are respectively provided at the output terminals 33 and 34. As a consequence, a potential difference occurs between the electrodes 18 and 19 of the liquid crystal display element 12, that is, a drive voltage is applied across them, and, as shown in FIG. 6A, the electrode area 35 of the electrode 19 having formed therein the display pattern 27 becomes colorless, and the part of the display pattern 27 to which no drive voltage is applied is displayed in red. In the liquid crystal display element 13, the same voltage is applied to the electrodes 33 and 34; namely, this means that no drive voltage is applied over the liquid crystal. As a result of this, the liquid crystal display element 13 assumes blue color over the entire area of its display surface. Accordingly, a display by the combination of the liquid crystal display elements becomes such as depicted in FIG. 6C in which the display pattern 27 is displayed in purple color which is a mixture of red and blue colors and the background 36 of the display pattern 27 is blue.

Figure 7A:
FIGS. 7A to 7D are waveform diagrams showing drive voltages which are applied to respective electrodes of a selected channel display section.
Figure 8A:
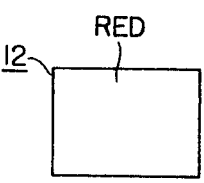
FIGS. 8A to 8C are diagrams respectively showing displays of the liquid crystal display elements 12 and 13 of the selected channel display section and their combined display.
Figure 7B:
Figure 8B:
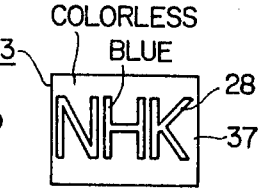
Figure 7C:
Figure 8C:
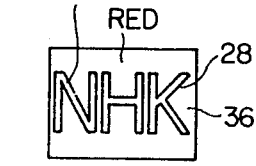
Figure 7D:

When the knob S$_4$ is actuated to turn ON the changeover switch 52, square wave voltages of the same waveform, such as shown in FIGS. 7A and 7B, are provided at the output terminals 31 and 32, respectively, and a voltage of FIG. 7C which has the same waveform as the voltage of FIG. 7A and a voltage of FIG. 7D which is displaced 180° apart in phase from the voltage of FIG. 7C are provided at the output terminals 33 and 34, respectively. Accordingly, the liquid crystal display element 12 is not driven and remains red over the entire area of its display surface, as shown in FIG. 8A, and the liquid crystal display element 13 is supplied with the drive voltage, by which an electrode area 37 having formed therein the display pattern 28 becomes colorless and the part of the display pattern 28 to which the drive voltage is not applied is displayed in blue color, as shown in FIG. 8B. As a result of this, the combined display of the liquid crystal display elements 12 and 13 becomes such as depicted in FIG. 8C in which the display pattern 28 is displayed in purple color and its background 36 is red. The square wave voltage generator 42 and the power supply 53 can be used in common to corresponding parts of the channel display sections $D_1$, $D_2$, .... Thus, by the operation of the changeover switch 52, the displays on the liquid crystal display elements 12 and 13 are changed over to each other.

With such an arrangement as described above, when none of the changeover switch knobs $S_1$, $S_2$, ... is actuated in FIG. 1, "1", "2", "3", "4", ... of the display patterns 27 of the channel display sections $D_1$, $D_2$, ... are all displayed in purple against backgrounds of blue color. In this case, for instance, when the knob $S_4$ alone is controlled to turn ON the corresponding changeover switch 52, the display pattern 28 of only the channel display section $D_4$ is displayed in purple color against a background of red color, but the displays of the other channel display sections remain unchanged. In this way, the background color of each channel display section indicates whether its channel is selected or not and, consequently, the user can intuitively learn the selected channel without reading its content from the display of the display pattern. In addition, also by changing the display format of the display pattern depending on whether its channel is selected or not, as in the above example, it is possible to provide an indication of whether the channel is selected or not. The display patterns 27 and 28 may also be of the same shape.

Since it can be determined by the background color whether each channel is selected or not, it is possible to discern the selected channel from the unselected ones even from a distance where the displays of the display patterns cannot be read or in such a short time that the displays cannot be read. Further, it is also possible to make the selected channel display conspicuous by selecting the background color, for example, by using a brighter color than the unselected channels. Moreover, in the case where the channel display when selected is produced by the liquid crystal display element 13 on the front and the channel display when not selected is provided by the liquid crystal display element 12 on the back, as in this embodiment, the display pattern of the selected channel display is displayed standing out against its background, whereas the display patterns of the unselected channel displays are displayed standing back from the display surface of the channel display. As a result of this, the display of the selected channel stands out from the displays of the other unselected channels and hence is easy to read. The liquid crystal display element 13 may also be disposed behind the liquid crystal display element 12 so that the display pattern of the selected channel is displayed standing back from the display surface of the channel display.

For producing such a conspicuous display of the selected channel, it is preferred to increase the thickness of each glass plate of the channel display. In the case where each glass plate was about 3 mm thick and the overall thickness of the assembly of the display elements 12 and 13 was approximately 12 mm, the display pattern 28 of the selected channel was displayed appreciably standing out from the display patterns of the unselected channels.

In the foregoing, the display pattern 28 indicating the channel is displayed in the channel display section when its channel is selected, but the display pattern 28 need not always be formed in the liquid crystal element 13. In such a case, the knobs $S_1$, $S_2$, ... are selectively operated to select a desired channel while observing the displays of the display patterns of the respective liquid crystal display elements 12 and the entire area of the channel display section of a selected channel is caused to assume a color different from the background color of unselected channels. Also it is possible to dispose the liquid crystal display element 13 behind the liquid crystal element 12 so that the display pattern 28 of the selected channel may be displayed standing back from the display patterns of the unselected channels.

By applying the present invention not only to the abovesaid channel display of the TV set but also to the case of selecting one or more of a plurality of ordinary channel displays or other displays, for example, for displaying a selected measurement point (channel) in the case of selecting data of a plurality of measurement points, it is possible to make a clear distinction between the display of the selected measurement point and the displays of the unselected ones.

Figure 9:
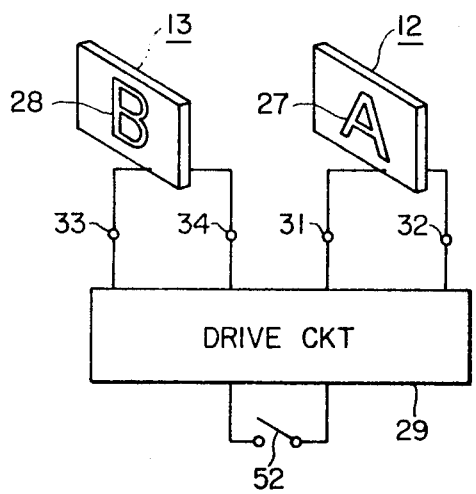
FIG. 9 is a diagram, corresponding to FIG. 4, illustrating another embodiment of the liquid crystal display device of the present invention.
Figure 10A:
FIG. 10A and 10B are diagrams respectively showing examples of displays which are provided by the embodiment of FIG. 9.
Figure 10B:

The present invention is applicable as well to a selective display of two display patterns in a single display unit. That is, only one channel display unit shown in FIG. 4 may be used as one display device. For example, as depicted in FIG. 9, the liquid crystal display elements 12 and 13 are disposed in adjacent and opposing relation. One of the electrodes of each of the liquid crystal display elements 12 and 13 has formed therein the display pattern 27 or 28, for example, in the form of a character "A" or "B". The electrodes of the liquid crystal display elements 12 and 13 are respectively connected to the terminals 31 to 34 of a drive circuit 29 of the type shown in FIG. 4. In the case where the liquid crystal display elements 12 and 13 respectively provide red and blue displays as is the case with FIG. 4, when the changeover switch 52 is in the OFF state, the character "A" of the display pattern 27 is displayed in purple color against a background of blue color, as shown in FIG. 10A. When the changeover switch 52 is turned ON, the character "B" of the display pattern 28 is displayed in purple color against a background of red color, as shown in FIG. 10B.

According to the embodiment of FIG. 9, by controlling the changeover switch 52, the display patterns 27 and 28 are selectively displayed against backgrounds of different colors. Accordingly, the display content can be learned from the display pattern and even if one display pattern cannot be discerned from the other when viewed from a distance, the display content can be understood from the color of its background. Further, the display content can be read out intuitively from the background color at a glance without reading the display pattern. By a suitable selection of the color of the display pattern and its background color, it is possible not only to permit an easy interpretation of the display pattern of the selected channel but also to attract particular attention to the display pattern. Moreover, in the case where the liquid crystal display element 13 on the front side is energized, its display pattern is displayed standing out in relief and when the liquid crystal display element 12 on the back is energized, its display pattern is displayed standing back a little. Thus, a plurality of display patterns can selectively be displayed at the same position, as viewed from the front, and consequently the display area can be small.

In the embodiments of FIGS. 1 and 9, the display colors of the liquid crystal display elements 12 and 13 are not limited specifically to red and blue colors but may be selected as desired. It is also possible to effect the display of the liquid crystal display element 12 by using, as a shutter, the liquid crystal display element 13 in combination with polarization plates. Alternatively, as a shutter, the liquid crystal display element 13 can be such that it is opaque and, by application of a voltage, becomes transparent. Also it is possible to diversify the color display functions by forming the liquid crystal display into a multi-layer structure with more than two layers.

As the liquid crystal display elements 12 and 13, use is made of the guest-host negative type display elements but it is also possible to use not only the nematic type display elements as mentioned previously in respect of FIG. 3 but also, for example, phase-transition type display elements. In the phase-transition type display element, cholesteric liquid crystal and dyestuff are added to a positive nematic liquid crystal and, at the initial stage, the liquid crystal is made in a planar arrangement or focal-conic arrangement and then the cholesteric phase is altered to the nematic phase by the application of a voltage, performing a negative display.

The color combination of the liquid crystal display elements 12 and 13 is not limited specifically to red and blue colors but may also be made various combinations, such as, for example, blue and yellow, red and yellow, green and red, purple and yellow, orange and blue, and so forth.

In FIG. 1, the display elements have been explained as if they were prepared individually; however, in a practical design, all of the display elements are formed as a unitary structure using continuous glass plates as shown in FIG. 11. Accordingly, those electrodes 19 of the liquid crystal display elements 12 of the channel display sections $D_1$, $D_2$, $D_3$, ... which have no display patterns are formed as a continuous electrode face common to all of them, and those electrodes 25 of the liquid crystal display elements 13 which have no display patterns are also formed as a continuous electrode face common to them. Further, voltages such as shown in FIGS. 5C and 7A are respectively applied to the common electrodes of the liquid crystal display elements 12 and 13, so that voltages of the same phase as the abovesaid voltages are also provided to the liquid crystal display elements 13 of the unselected channel displays and the liquid crystal display element 12 of the selected channel display. In the case of using an independent electrode for each channel display, however, voltages are provided only to the liquid crystal display elements 12 in the unselected channel displays and only to the liquid crystal display element 13 in the selected channel display. Especially in the embodiment of FIG. 9, it is also possible to supply drive voltages only to a selected one of the liquid crystal display elements 12 and 13.

It will be apparent that many modifications and variations may be effected without departing from the scope of the novel concepts of this invention.

What is claimed is:

1. A liquid crystal display device comprising:
a plurality of display elements arrayed on a common plane, each of said display elements comprising a first color liquid crystal display cell of a guest-host type normally exhibiting a color which can be changed to a colorless transparent state by application of a voltage to said first cell, and a second color liquid crystal display cell superimposed on said first color liquid crystal display cell, said second color liquid crystal display cell being of a guest-host type which normally exhibits a color different from that of said first color liquid crystal display cell and which can be changed to a colorless transparent state by application of a voltage to said second cell, each of said first color liquid crystal display cells having first transparent electrodes respectively formed on both of the opposing inner surfaces thereof, at least the first transparent electrodes on the same sides of said first color liquid crystal display cells being formed in negative patterns, and each of said second color liquid crystal display cells having second transparent electrodes respectively formed on both of the opposing inner surfaces thereof;
a drive source for generating an alternating drive voltage;
a plurality of switches operative respectively to change over the application of said drive voltage to either said first or said second cell of a corresponding one of said display elements; and
drive circuit means connected to said switches, to said drive source, and to said first and second color liquid crystal display cells for applying said drive voltage from said drive source to one of said first and second cells of each of said display elements under the control of said switches.

2. A liquid crystal display device according to claim 1 wherein one of the electrodes of at least one of said second color liquid crystal display cells in a given one of said display elements is formed as a negative pattern of a pattern to be displayed by said display element.

3. A liquid crystal display device according to claim 2 wherein said negative pattern of at least one of said second color liquid crystal display cells in said display element is the same as that of the corresponding one of said first color liquid crystal display cells in said display element.

4. A liquid crystal display device according to claim 2 wherein said negative pattern of at least one of said second color liquid crystal display cells in said display element is different from that of the corresponding one of said first color liquid crystal display cells in said display element.

5. A liquid crystal display device according to one of claims 2-4 wherein the array of at least one of said first and second color liquid crystal display cells is formed as a unitary structure using a continuous glass plate common to all of said display elements, the first transparent electrodes opposite to those formed in negative patterns being formed as a continuous electrode common to all of said first color liquid crystal display cells, and the second transparent electrodes on one of the inner surfaces of respective said second color liquid crystal display cells being formed as a continuous electrode common to all of said second color liquid crystal display cells.

6. A liquid crystal display device according to one of claims 2–4 comprising a polarizer mounted on one side of the array of said display elements, at least one of said first and second color liquid crystal display cells containing therein a nematic liquid crystal having a positive dielectric anisotropy and in which a dichroic dye is dissolved.

7. A liquid crystal display device according to claim 5 comprising a polarizer mounted on one side of the array of said display elements, at least one of said first and second color liquid crystal display cells containing therein a nematic liquid crystal having a positive dielectric anisotropy and in which a dichroic dye is dissolved.

8. A liquid crystal display device according to one of claims 2–4 wherein at least one of said first and second color liquid crystal display cells contains therein a phase-transition type liquid crystal in which a dichroic dye is dissolved.

9. A liquid crystal display device according to claim 1 wherein said first color liquid crystal display cells are disposed in front of said second color liquid crystal display cells.

* * * * *